(No Model.)

S. HAIRE.
CAR BRAKE.

No. 540,248. Patented June 4, 1895.

WITNESSES:

INVENTOR
Scott Haire.
BY
ATTORNEYS

UNITED STATES PATENT OFFICE.

SCOTT HAIRE, OF REDSTONE, PENNSYLVANIA.

CAR-BRAKE.

SPECIFICATION forming part of Letters Patent No. 540,248, dated June 4, 1895.

Application filed April 6, 1895. Serial No. 544,769. (No model.)

*To all whom it may concern:*

Be it known that I, SCOTT HAIRE, of Redstone, in the county of Fayette, State of Pennsylvania, have invented an Improved Brake, of which the following is a specification.

This invention relates to brakes for cars and all kinds of vehicles to which it is applicable.

The object of the invention is to provide a simple and effective means whereby the brake can be quickly and positively applied and which will not be in the way to prevent the coupling of the cars or vehicles or project so as to interfere with the passage of vehicles in close quarters.

The improvements consist of the novel features which will be hereinafter more fully described and claimed, and which are shown in the annexed drawings, in which—

Figure 1:
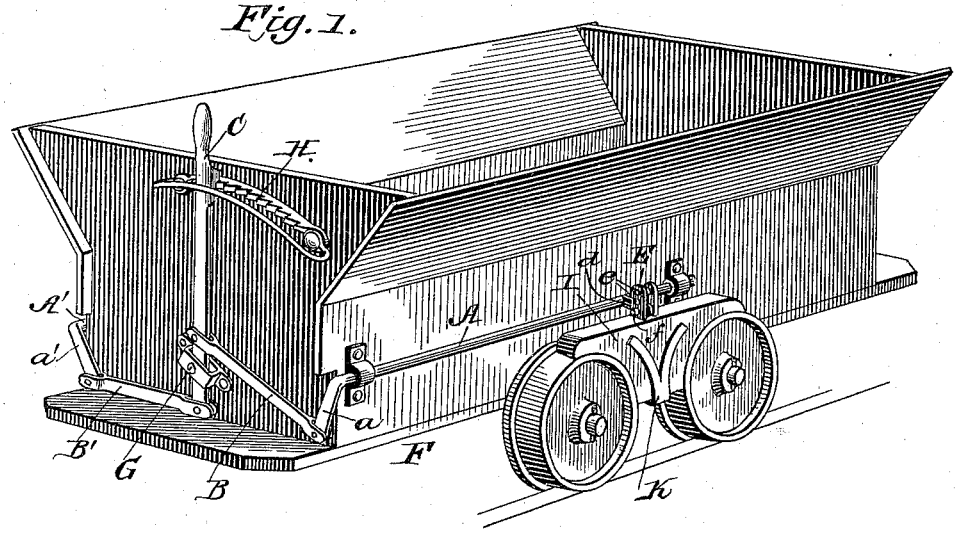
Figure 2:
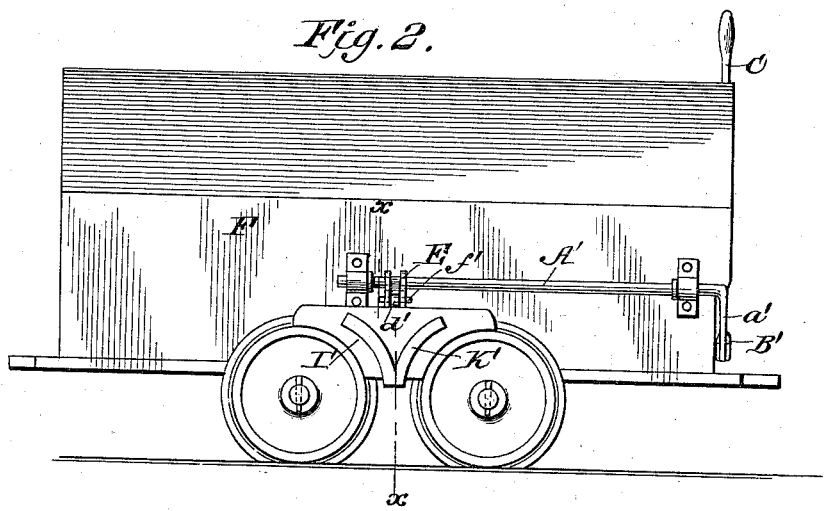
Figure 3:
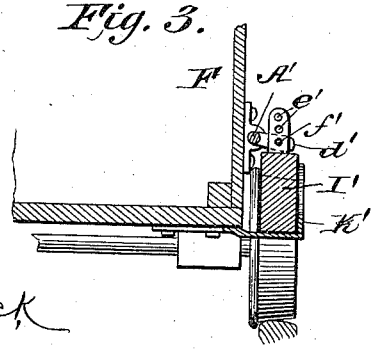

Figure 1 is a perspective view of a car, showing the appliance of my invention; Fig. 2, a side view of the side which is hidden in Fig. 1. Fig. 3 is a cross-section on the line X X of Fig. 2.

The shafts A and A' on each side of the car or vehicle F, are journaled in suitable bearings and have arms $d$ and $d'$ and cranks $a$ and $a'$ respectively. The operating lever C is pivoted to the front of the car or vehicle at G, and is connected with the cranks $a$ and $a'$ by the links B and B' which have connection with said lever on opposite sides of and equidistant from pivot G. The upper end of lever C passes through notched keeper H by which it is held in an adjusted position. The brake blocks I and I' have vertical stems, E and E' respectively, which have a series of openings $e$ and $e'$. The arms from the shafts are adjustably connected with these stems by pins $f$ and $f'$. These blocks are cut away on opposite ends to receive the wheels and are held against lateral displacement by brackets K and K' which are fastened to the bottom of the vehicle and have their outer ends bifurcated and spread as shown to obtain a broad purchase on the blocks. By operating lever C, in the proper direction, the shafts A and A' will be rotated and apply the brakes and by reversing the motion of the lever C the brakes will be removed, the operation being manifest.

Having thus described my invention, what I claim, and desire to secure by Letters Patent, is—

1. The combination with the shaft and the brake shoe suspended therefrom, of the bracket for preventing lateral displacement of the brake shoe, substantially as described.

2. The combination of the two sets of wheels, the shafts A and A' having cranks and arms, and the brake blocks connected with the said arms, of the lever C and the links B and B', connecting the said lever with the cranks on the shafts, said links being connected with the lever on opposite sides of and equidistant from the pivot of the lever, substantially as described.

In testimony whereof I affix my signature in the presence of two witnesses.

SCOTT HAIRE.

Witnesses:
J. C. HILDERBRAND,
SAMUEL O'NEIL.